June 2, 1970  C. C. LEONARD  3,514,901

FARM GATE

Filed Jan. 8, 1969

INVENTOR
CAREY C. LEONARD
BY
McNENNY, FARRINGTON, PEARNE & GORDON

ATTORNEYS 3,514,901
FARM GATE
Carey C. Leonard, Rte. 2, Cumberland, Ohio 43732
Filed Jan. 8, 1969, Ser. No. 789,705
Int. Cl. E06b *11/04*
U.S. Cl. 49—191                            2 Claims

ABSTRACT OF THE DISCLOSURE

A farm gate having a pair of substantially parallel gate bars, one of which is hinged to a gatepost, and a cross linkage means comprising a plurality of parallel members each pivotally connected to the gate bars. The cross linkage means includes at least one rigid compression crossbar and tension members, which may be ordinary barbed fence wires, above and below the compression member. The cross linkage and the parallel gate bars form a parallelogram which may be shifted upwardly or downwardly so that the free gate bar may rest upon the ground in both opened and closed positions, regardless of any upward or downward slope of the ground from the hinged gate bar. The cross linkage means may be adjusted horizontally so that the gate may fit a wide variety of gate openings. When the tension members are tightened, they hold the gate bars parallel and in a plane. In the preferred embodiments, the tension members are wires pivoted to adjustable eyebolts for maintaining tension, the pivot points of the wires being slightly closer together in all adjusted positions than the pivot points of the central compression member so that there is no danger of slackening and tangling the wires when the free gate bar is raised or lowered, the slight increase in tension in the wires being insufficient to interfere with upward and downward movement of the free gate bar.

BACKGROUND OF THE INVENTION

Farm gates have been proposed which include a vertical gate bar hinged to a gatepost and a second vertical gate bar which is releasably latched to a second gatepost. These farm gates include cross linkages which prevent downward movement of the latching gate bar, while permitting it to be moved upwardly relative to the hinged gate bar to unlatch the gate and to permit the gate to clear obstructions when the gate is swung open.

For example, in U.S. Pat. No. 496,858 to Christian, a gate is set forth having a link which is pivoted at one end to the hinged gate bar and which is pivoted to the latching gate bar at a higher elevation than its first-mentioned pivotal connection. This arrangement prevents the latching gate bar from moving downwardly or resting on the ground, while permitting it to be lifted upwardly so that the gate may clear obstructions. The upward movement slackens the wires. Similar arrangements are set forth in U.S. Pats. No. 417,118 to Thompson and No. 855,948 to Higbe. These patents include spring means to bias the latching gate bar upwardly when the gate bar is unlatched.

These prior art proposals, however, do not permit the latching gate bar to be moved downwardly relative to the hinged gate bar. Such a feature is highly desirable in an environment where the gate is opened or closed over a downwardly sloping surface, since in such an environment free downward movement of the latching gate bar permits that gate bar to rest upon the ground and thereby retain the gate in an open condition. In addition, the weight of the gate in open position imposes no transverse load on the gatepost.

SUMMARY OF THE INVENTION

This invention provides a farm gate having a hinged gate bar and a latching gate bar which are pivotally connected together by a cross linkage means which will permit the latching gate bar to be moved either downwardly or upwardly relative to the hinged gate bar from a position wherein the gate bars define a square or rectangle. This arrangement permits the gate to be held in an open position by resting the latching gate bar on the ground whether the ground slopes upwardly or downwardly from the gatepost.

The cross linkage includes a rigid crossbar which is pivoted at its ends to the gate bars and which is normal to the gate bars when the gate is in its closed position. The cross linkage also includes wires which are parallel to the rigid crossbar and to each other, and which are pivotally connected to the gate bars by adjustable eyebolts. The rigid crossbar may be formed by telescoping sections so that the crossbar may be adjusted to provide a gate which will accommodate a wide variety of gate openings.

DETAILED DESCRIPTION OF THE PREFERRED EMBODIMENT

Figure 1:
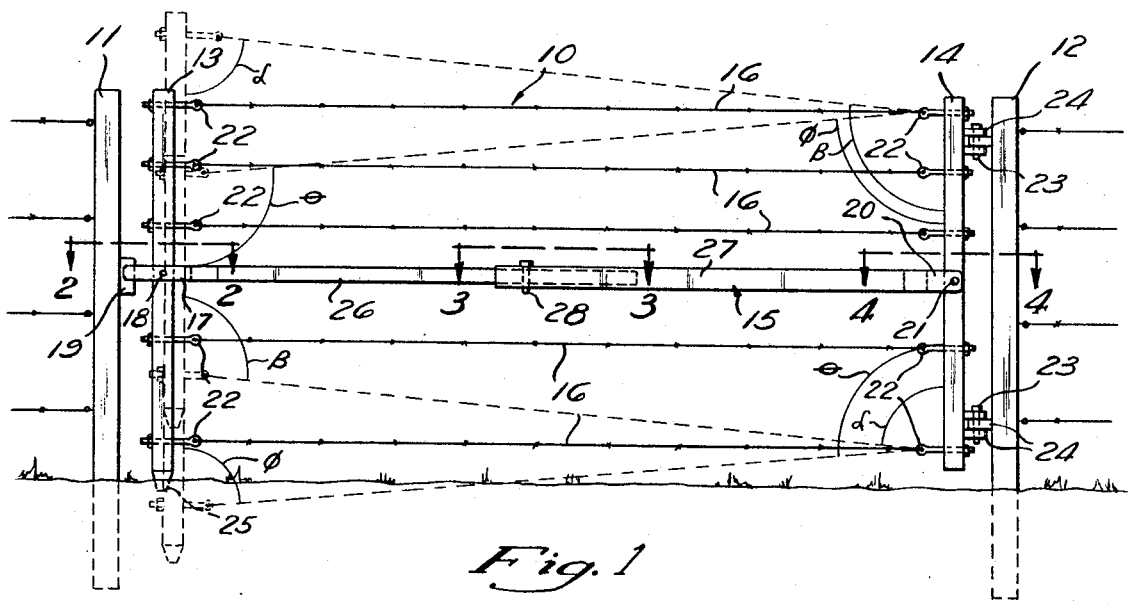
FIG. 1 is an elevational view of a gate according to this invention.

Referring now to the drawing, a farm gate 10 is illustrated. The gate 10 is mounted to close an opening between a pair of gateposts 11 and 12. The gate 10 includes a latching gate bar 13 and a hinged gate bar 14, and further includes a cross linkage means which comprises a rigid crossbar 15 and a plurality of connecting wires 16.

Figure 2:
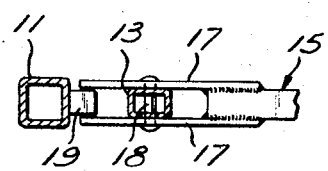
FIG. 2 is a cross sectional view, the plane of the section being indicated by the line 2—2 in FIG. 1.

With the gate 10 in its closed position, the crossbar 15 is normal to the gate bars 13 and 14 and, as may be seen in FIG. 2, one end of the crossbar 15 has a pair of plates 17 fixed thereto and which extend beyond the end of the gate bar 15. The plates 17 are pivotally connected to the gate bar 13 by a pin 18 and straddle a latching block 19 which is fixed to the gatepost 11. The other end of the crossbar 15 has a pair of plates 20 fixed thereto. The plates 20 extend from the end of the bar 15 and are pivotally connected to the gate bar 14 by a pivot pin 21.

The wires 16 are pivotally connected to the gate bars 13 and 14 by a plurality of eyebolts 22 so that the pivotal connections between each wire 16 and its eyebolts 22 are spaced closer to each other than the pivotal connections between crossbar 15 and the gate bars 13 and 14.

Figure 5:
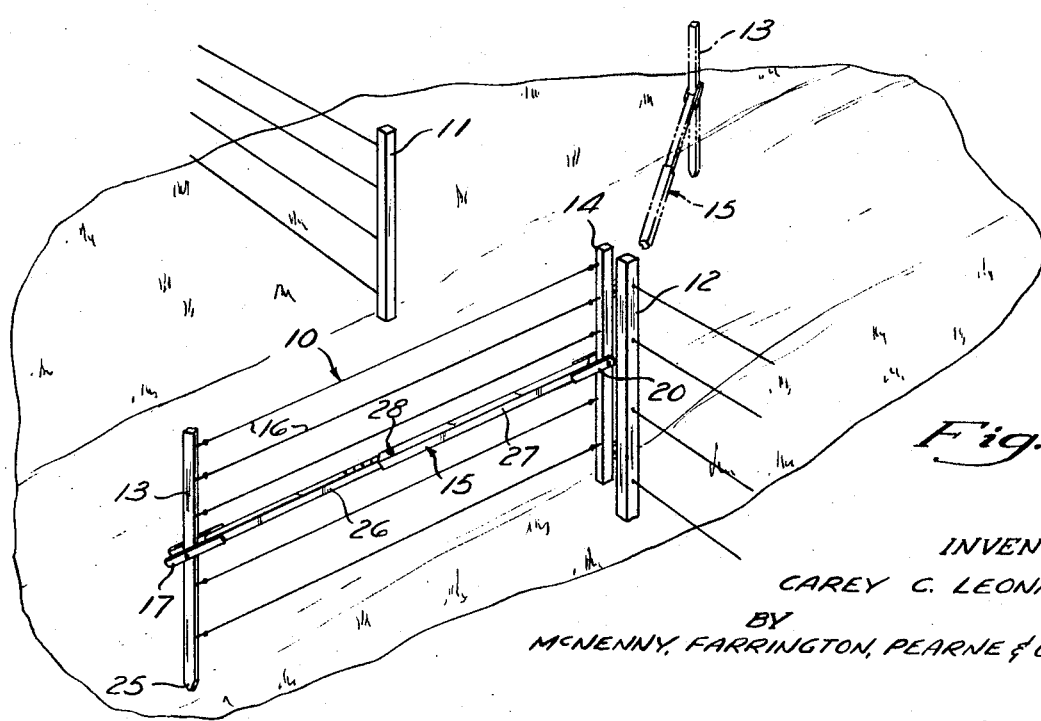
FIG. 5 is a perspective view of the gate showing the gate in open positions.

The gate bar 14 is hinged to the gatepost 12 for movement in either direction by pins 23 which extend through hinge eyes 24. The gate 10 may be opened either inwardly or outwardly by raising the gate bar 13 so that the plates 17 clear the latching block 19. If the gate opening is such that the gate extends across a sloping surface, as is shown in FIG. 5, the gate may be opened in an uphill direction (as shown in phantom outline in FIG. 5) by moving the gate bar upwardly to clear the surface. When the gate is opened to a desired position, it may be retained in this position by resting an end 25 of the gate bar 13 on the ground. Furthermore, as may be seen in solid outline in FIG. 5, the gate 10 may be opened in a downhill direction and then fixed in a desired open position by moving the gate bar 13 downwardly and resting the end 25 on the ground.

As may be seen in FIG. 1, when the gate 10 is moved upwardly from its rectangular position illustrated in solid outline to the position illustrated in phantom outline, the gate bars 13 and 14 and the cross linkage means form a parallelogram having a first pair of opposite acute angles $\alpha$ and a second pair of opposite obtuse angles $\beta$. When the gate 10 is moved downwardly from its rectangular position illustrated in solid outline, the gate bars 13 and 14 and the cross linkage means form a parallelogram having a first pair of opposite acute angles $\phi$ and a second pair of opposite obtuse angles $\theta$.

Upward or downward movement of the gate bar 13 relative to the gate bar 14 is permitted by the cross linkage means. The gate 10 forms a square or rectangle by the disclosed cross linkage means. Upon such upward or downward movement of the gate bar 13, the wires 16 may tend to stretch. The eyebolts 22 may be retightened to re-establish the proper tension in the wires. The eyebolts are needed because the fence wires gradually stretch and slacken and need to be retightened from time to time.

Figure 3:
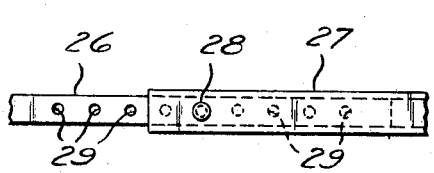
FIG. 3 is a cross sectional view, the plane of the section being indicated by the line 3—3 in FIG. 1.
Figure 4:
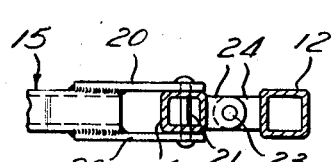
FIG. 4 is a cross sectional view, the plane of the section being indicated by the line 4—4 in FIG. 1.

As may be seen in FIG. 3, the crossbar 15 is formed by telescoping members 26 and 27, which are connected together by a bolt 28. The bolt 28 extends through the member 27 and through one of a plurality of holes 29 in the member 26. This arrangement permits the effective length of the crossbar 15 to be varied so that a gate 10 may be adjusted to accommodate a wide variety of gate openings.

The invention is not restricted to the slavish imitation of each and every detail set forth above. Obviously, gates may be provided which change, eliminate or add certain specific details without departing from the scope of the invention.

I claim:
1. A gate having a pair of substantially parallel gate bars, a first one of said bars adapted to be hinged to a gatepost, cross linkage means pivotally connecting said first one of said bars and being normal thereto to a second one of said bars and with said first and second bars forming a parallelogram, said cross linkage means and said bars being movable from a position wherein said parallelogram is a square or a rectangle to a first position wherein said linkage and bars define a parallelogram having a first pair of opposite acute angles and a second pair of opposite obtuse angles and to a second position wherein said linkage and bars define a parallelogram wherein said first pair of angles are obtuse and said second pair of angles are acute whereby said second one of said bars may contact the ground and support the gate when the gate is in its open position.

2. A gate according to claim 1 wherein said cross linkage means includes a rigid bar comprising a first member having one end telescoped within a second member and means to lock said members together in any one of a plurality of telescoped positions.

References Cited

UNITED STATES PATENTS

| | | | |
|---|---|---|---|
| 251,728 | 1/1882 | Patterson et al. | 49—191 X |
| 402,439 | 4/1889 | Haas | 160—328 |
| 855,948 | 6/1907 | Higbe | 160—328 |
| 887,676 | 5/1908 | Malone | 160—328 |
| 901,865 | 10/1908 | Ansted | 160—328 |
| 960,351 | 6/1910 | Law | 49—191 X |

DENNIS L. TAYLOR, Primary Examiner